July 13, 1926.  
A. COPONY  
1,591,963

DECKING DEVICE

Filed March 17, 1923   2 Sheets-Sheet 1

Perry H. Irish  
Emma J. Irish  
WITNESSES.

Alfred Copony  
INVENTOR.

July 13, 1926.
A. COPONY
DECKING DEVICE
Filed March 17, 1923  2 Sheets-Sheet 2
1,591,963
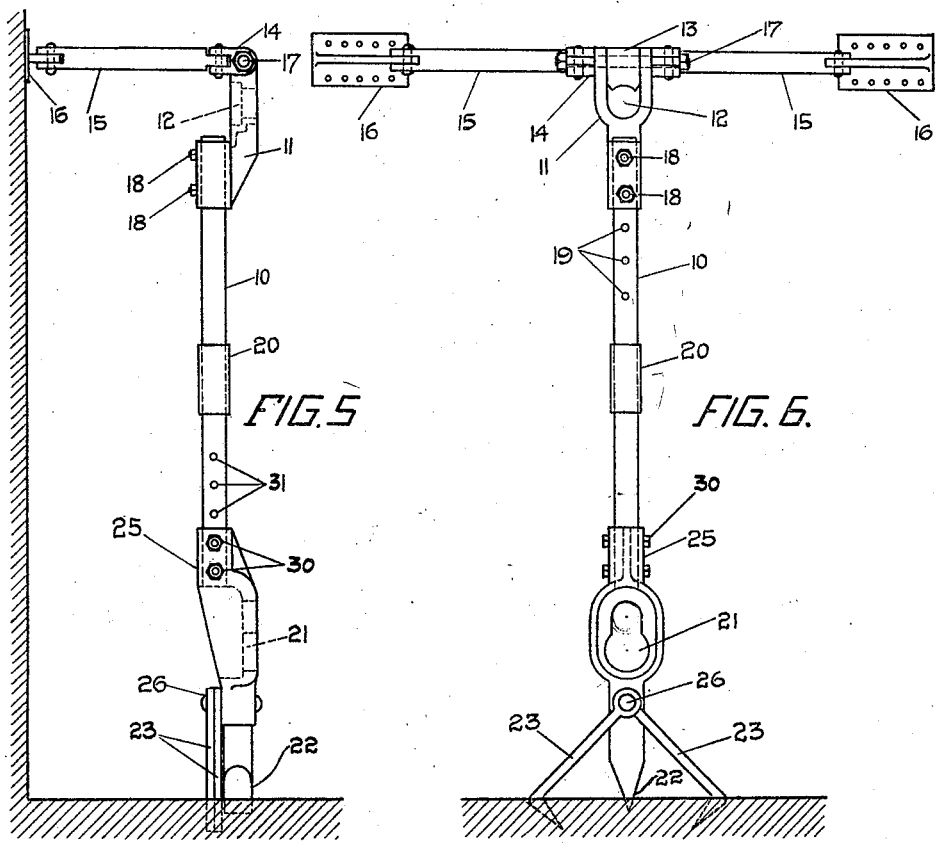
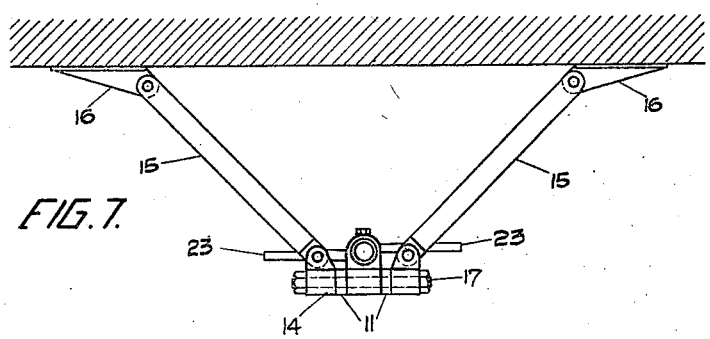
Perry H. Irish
Emma J. Irish
WITNESSES.
Alfred Copony
INVENTOR.

Patented July 13, 1926.

1,591,963

UNITED STATES PATENT OFFICE.

ALFRED COPONY, OF MOUNT CLEMENS, MICHIGAN.

DECKING DEVICE.

Application filed March 17, 1923. Serial No. 625,785.

My improvements relate to the loading and decking of automobiles in freight cars and have for their object not only the proper holding and securing of the upper automobile in its proper position, but they also provide means for simultaneously securing the lower machine in place thereby saving the use of independent securing means for the lower machine and incidental material-labor and freight charges connected therewith. One form of my device is designed to be made of lumber in a cheap and efficient way while another form is designed to be made of metal and is of a foldable construction adapted to be used repeatedly.

Figure 1:
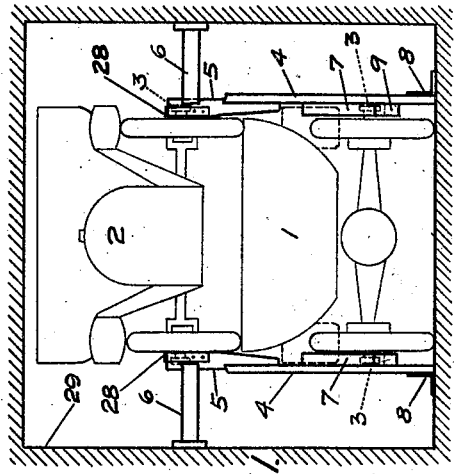
Figure 3:
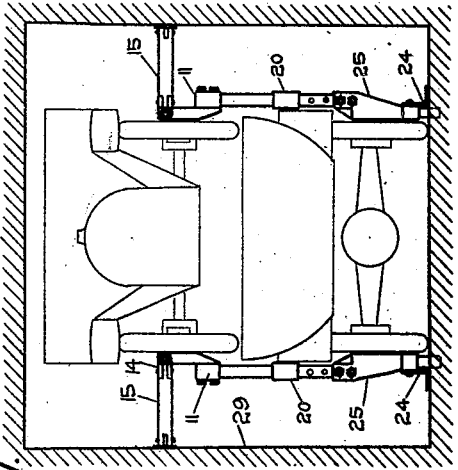
Figure 2:
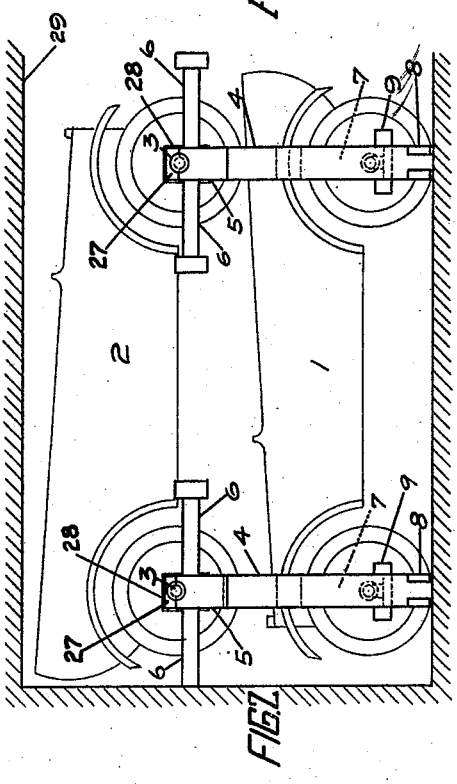
Figure 4:
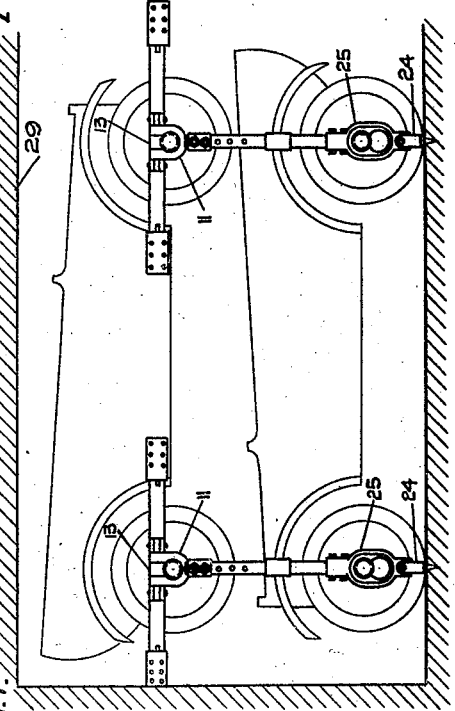

In the drawings. Fig. 1 shows the cross section of a freight car outlined, with my wooden decking device applied to two automobiles therein, Fig. 2 shows a rough outline of part of a longitudinal section through a freight car with the front side of the car removed and my wooden decking device in place and applied to two automobiles, Fig. 3 shows the cross section of a freight car outlined, with my metal decking device applied to two automobiles therein, Fig. 4 shows a rough outline of part of a longitudinal section through a freight car with the front side of the car removed and my metal decking device in place and applied to two automobiles therein, Fig. 5 shows an end view of my metal decking device on a larger scale, Fig. 6 shows a side view of my metal decking device, while Fig. 7 shows a top view of the same device.

The embodiment of my invention is shown in connection with a railroad freight car outlined in 29, of usual construction as far as the general structure of the car is concerned. 1 indicates the lower automobile to be fastened to the floor, while 2 shows the outline of the upper automobile to be supported above the lower automobile 1. For this purpose a wooden column 4 is used cut square at its bottom edge and bevelled at the top to engage an upper hub supporting bracket 5 which is fastened to column 4 by means of nails driven through 4 and 5. Upper hub supporting bracket 5 is notched out as shown in Figs. 1 and 2, to fit the hub 3 of automobile 2. A wooden capping piece 27 fits over the top of hub 3 and can be secured by nails driven through 27 into upper hub support bracket 5. It can be additionally secured by a tie strap of steel 28 which extends from side to side of upper hub support bracket 5, over capping piece 27. Brace arms 6 extend from the head of upper hub supporting bracket 5 diagonally towards the side of the railway car 29 and can there be fastened in any approved manner. The lower automobile is held in place by lower hub pressure bracket 7 fastened on the inside face of column 4 by means of nails driven through 4 and 7. This lower hub pressure bracket 7 is notched at its lower end to fit the hub 3 of lower automobile 1 and is kept from spreading by retainer piece 9 which is cut to fit over the narrow sides of lower hub pressure bracket 7 and fastened to column 4 by means of nails driven through 4 and 9. The lower end of column 4 can be fastened to the floor of the freight car 29 by means of angles 8 and nails.

In use, automobile 2 is first raised into position by means of chain falls attached to the roof carlins of the railway car. Then short sections of old inner tubes or the like are applied to the hubs of both automobiles to prevent chafing. Then the lower automobiles is placed under the suspended upper automobile. Thereupon the wooden column structures comprising 4, 5 and 7 are applied in such a manner that lower hub pressure bracket 7 engages hub 3 of automobile 1, but due to the inflation of tires of automobile 1 the lower edge of column 4 is not in contact with the floor. Then upper hub support bracket 5 is adjusted under hub 3 of automobile 2. All four column structures are temporarily applied in a similar manner. Then upper automobile 2 is lowered unto the upper hub support brackets 5 until the lower end of column 4 is in contact with the floor of car 29 incidentally compressing the lower portion of tires of automobile 1 so that the lower automobile is securely held in place. Still holding the upper automobile 2 by means of chain falls loosely in place the upper automobile can be swayed and twisted in such a manner that the columns stand vertical and clear the fenders of the lower automobile 1 equally on both sides. Then side brace arms 6 are nailed into place at the head of upper hub support bracket 5 and to the side of car 29 in any approved manner. The lower end of column 4 is then secured by angles 8 to the floor of the car 29. Then retainer pieces 9 are put in place to grip the lower edges of hub pressure bracket 7 and nailed to column 4. Finally capping piece 27 is placed on top of hub 3 of automobile 2 nailed direct to upper hub supporting bracket 5 and furthermore secured additionally by means of straps 28.

My steel decking device shown in Figs. 3, 4, 5, 6 and 7, is designed on the same principle but different structural elements are used as will be seen in the drawings.

Pipe column 10 is secured at its upper end by means of adjusting holes 19 and bolts 18 to upper hub support bracket 11 which has an offset recess 12 to fit hub 3 of automobile 2. A recess filler 13 is secured by means of bolt 17 to 11. This bolt 17 connects also with swivel joints 14 which in turn connect with side brace arms 15 terminating in shoes 16 which are provided with nail holes to permit nailing them to the side of railway car 29. A rubber hose 20 is provided on column 10 to eliminate chafing the fenders of lower automobile 1 when the structure is put in position. The lower end of pipe column 10 terminates in lower hub pressure bracket 25 equipped with an offset keyhole shaped recess 21 that permits easy adjustment over hub 3 of automobile 1. The bottom end of lower hub pressure bracket 25 terminates in a point or knife edge 22 which enters the wooden floor of railway car 29 when weight of upper automobile 2 is applied. Base clamps 23 are riveted to lower hub pressure bracket 25, Figs. 5, 6 and 7, or floor angles 24, Figs. 3 and 4 of a similar structure as those shown at 8 in Figs. 1 and 2. By using a keyhole recess 21 in my steel structure I achieve the same results as those attained by lower hub pressure bracket 7 and retainer piece 9 of my wooden structure shown in Figs. 1 and 2. In this structure upper hub support bracket 11 is adjustable in height on column 10 by means of holes 19 and bolts 18 and lower hub pressure bracket 25 is adjustable to different sized wheels by means of bolts 30 and holes 31.

The application of my metal decking device to automobiles 1 and 2 is identical to the method of application set forth in describing my wooden decking device.

From the general principles involving my structures it will be seen that the static load comprising the weight of the upper automobile is directly transmitted by means of columns placed in a vertical plane direct to the floor and further, the dynamic stresses occasioned by shunting shocks while car is in transit are taken up in full measure by the side braces to the railway car side for the upper automobile 2 while smaller additional dynamic stresses are transmitted through the column from the lower automobile 1 to the side braces of my structure and to the floor of the car. Additional strength is lent my steel structure by base clamps 23 which serve the two fold purpose of fastening the bottom of my structure to the floor and further take up part of the dynamic stresses originating in the lower automobile which are transmitted through the hub of the lower automobile to the floor of the car by means of the base clamps 23.

In case the wheel base of the upper automobile is longer or shorter than the wheel base of the lower automobile my steel structure will not be affected, the only difference being, that the column while still in a vertical plane will be inclined to their base in that plane.

A further way of adapting my metal structure for different wheel bases of automobiles to be decked, would be, to offset the lower hub pressure bracket forward or backward of a plane laid through opposing columns and thereby meet the requirements of such difference in wheel base and still retain vertical columns. The wooden structure can be adapted to this condition by cutting the lower edge of the column on a bevel to meet this premise. All my structures can be used in connection with upper automobiles the wheels of which were removed in order to accommodate very low freight cars.

The devices shown being illustrative of their character, it is to be understood that variations other than those shown are included in the scope and within the principle of my invention.

Having described my invention, what I claim as new and desire to secure by Letters Patent is:

1. In an automobile loading device for freight cars, the combination of supporting means for an upper and lower automobile, means for utilizing the weight of the upper automobile to engage said supporting means by penetration with the floor of said freight car, and clamping means on said supporting means to prevent disengagement of said supporting means from said floor of said freight car.

2. In combination with a freight car, vertical columnar supporting means spaced from the car wall but close to and parallel to an antomobile, for vertically supporting an automobile above another, means for engaging said lower and upper automobile by means of axle stub or hub to said vertical supporting means, and triangular bracing means to transmit dynamic shocks originating in said upper and lower automobile to the side walls of said freight car.

3. In combination with a freight car, offset vertical columnar supporting means spaced from the car wall but close to and parallel to an automobile for vertically supporting said automobile above another, means for engaging said lower and upper automobile by means of axle stub or hub to said vertical supporting means, and triangular bracing means to transmit dynamic shock originating in said upper and lower automobile to the side walls of said freight car.

4. In combination with a freight car, offset vertical columnar adjustable supporting means spaced from the car wall but close to and parallel to an automobile, for vertically supporting said automobile above another, means for engaging said upper and lower automobile by means of axle stub or hub to said supporting means, triangular bracing means to transmit dynamic shocks originating in said upper and lower automobile to the side walls of said freight car, and bracing means to transmit dynamic shocks of said upper and lower automobile to the floor of said freight car.

5. In combination with a freight car, means for eccentrically supporting the weight of an upper automobile in substantially vertical planes parallel to the axis of a freight car, means for transmitting a portion of said weight of said upper automobile to a lower automobile, means for engaging said lower automobile to said supporting means of said upper automobile and triangular bracing means to transmit dynamic shocks originating in said upper automobile and said lower automobile to the side walls of said freight car.

6. In combination with a freight car, means for eccentrically supporting the weight of an upper automobile in substantially vertical planes, means for transmitting a portion of said weight of said upper automobile to a lower automobile, means for engaging said lower automobile to said supporting means of said upper automobile, triangular bracing means to transmit dynamic shocks originating in said upper and lower automobile to the side walls of said freight car and means to transmit dynamic shocks originating in the lower automobile to the floor of said freight car.

7. In combination with a freight car, means for adjustably and vertically supporting the weight of an automobile in a substantially vertical plane, said means for transmitting said weight of said automobile to the floor of said freight car, means to engage said weight transmitting means with and into said floor of said freight car by means of said weight of said automobile.

8. In combination with a freight car, means for adjustably supporting the weight of an automobile in a substantially vertical plane, means for transmitting said weight of said automobile to the floor of said freight car, means to engage said weight transmitting means with and into said floor of said freight car by means of said weight of said automobile and additional securing means attached to said weight transmitting means to prevent disengagement of said weight transmitting means from said floor of said freight car, while said freight car is in transit.

9. In combination with a freight car, means for adjustably and vertically supporting the weight of an upper automobile in substantially vertical planes, means for adjustably transmitting part of said weight of said upper automobile to a lower automobile, means to engage said weight transmitting means with and into said floor of said freight car by means of part of said weight of said upper automobile and additional securing means attached to said weight transmitting means to prevent disengagement of said weight transmitting means from said floor of said freight car, while said freight car is in transit.

ALFRED COPONY.